United States Patent
Lin (10) Patent No.: US 8,452,346 B1
(45) Date of Patent: May 28, 2013

(54) PROGRAMMABLE TIME-BASED RINGTONE SETTING IN A MOBILE STATION

(75) Inventor: Zhijian Lin, Dublin, CA (US)

(73) Assignee: Cellco Partnership, Basking Ridge, NJ (US)

( * ) Notice: Subject to any disclaimer, the term of this patent is extended or adjusted under 35 U.S.C. 154(b) by 113 days.

(21) Appl. No.: 12/763,004

(22) Filed: Apr. 19, 2010

(51) Int. Cl.
*H04M 1/00* (2006.01)

(52) U.S. Cl.
USPC ........ 455/567; 455/550.1; 455/466; 455/557; 379/164; 379/179; 379/252

(58) Field of Classification Search
USPC ............... 455/550.1, 557, 567, 466; 379/164, 379/179, 252, 373.01–373.03, 374.03
See application file for complete search history.

(56) References Cited

U.S. PATENT DOCUMENTS

| | | | |
|---|---|---|---|
| 2003/0143954 A1* | 7/2003 | Dettinger et al. | 455/46 |
| 2008/0207263 A1* | 8/2008 | May et al. | 455/556.2 |

* cited by examiner

*Primary Examiner* — Fayyaz Alam (57) ABSTRACT

To address a time related problem with mobile station ringtones, such as sleep disturbing ringtone generation, a mobile station may be configured to offer the user an option or feature such as might enable programming of ringtone settings as a function of one or more time periods. When the feature is selected, it allows the user to program settings configuring the device to adjust one or more controllable parameters of ringtone for incoming calls and/or incoming messages based on current time in relation to the time program settings. For example, the user might set different ringtone settings for different time slots for each day and/or different time slots on certain days of the week.

20 Claims, 4 Drawing Sheets

PROGRAMMABLE TIME-BASED RINGTONE SETTING IN A MOBILE STATION

TECHNICAL FIELD

The present subject matter relates to techniques and mobile stations configured to enable a user of such a station to establish a time schedule and related parameters to control one or more characteristics of ringtone output over time, for example, to provide different volumes at different times of the day in response to incoming calls, messages, or the like.

BACKGROUND

With the ever-increasing use of mobile communication devices such as cellular telephones and smart phones, users of such devices are becoming 'wired-in' for communications almost twenty-four hours a day, seven days a week and fifty-two weeks a year. The advantage of the mobile stations and the communications networks that provide various voice call, messaging and data services to users of such devices is that they can deliver communications anywhere any time that a device is on and has access to a network. As a consequence, a user may receive a call or an incoming message at any time of day or night, whether convenient or not.

A mobile station has the capability to generate an audible alert, referred to as a ringtone or call sound, whenever it receives a call or message. Many such devices offer the user various options or selections with regard to the ringtones, for example, different tones for calls as opposed to one or more types of messages. Some devices generate different ringtones based on caller identification information, such as whether or not the caller is a party on a contact list stored in the mobile station. The user may also be able to select a no-ringtone setting, for some or all types of incoming communications. The mobile station may also offer a range of volume settings from an OFF (no audible sound—similar to a no-ringtone setting) to some maximum available volume setting. However, once set to a particular tone and level, the mobile station will generate the corresponding tone (e.g. signifying an incoming voice call or new message directed to the station) at the set volume, for as long as the user leaves the device settings in place. The ringtone to use for a particular type of incoming communication and the volume will change only when the user changes the relevant setting(s). As a result, the mobile station will ring, potentially with a loud disturbing volume, at times when it may not be convenient to the user but the user has not changed the necessary setting(s).

For example, a loud ring due to a call or incoming message may ruin the user's good sleep. A customer service representative might call the user at 5:30 AM PST, because it was 8:30 AM EST at the representative's location. Sometimes, calls to the wrong number might come in at 2:00 AM, and force the user awake just to find out somebody dialed the wrong number. Many mobile stations offer different ringtones and settings for voice calls and voice mail messages. If the user turns off the voice call ringtone, the user may still hear a tone if the caller decides to leave a voice message, unless the user also has turned off the voice message tone function.

There have been proposals to block or divert incoming telephone calls based on time of day and/or day of the week. For example, a business having offices in different time zones might instruct the phone network to route incoming calls to an east coast office while open but divert calls to a west coast office after the east coast office closes at the end of each business day. Individual subscribers might configure the call forwarding on their home telephone line or cell phone to forward all calls to voice mail at certain times, e.g. during the hours they intend to sleep. These approaches have relied on complex systems in or connected to the telephone network to accept timing instructions from the user and to route the calls based on time. Also, in the mobile station context, a voice mail message might still generate an alert at the mobile station during call forwarding to voice mail.

Also, banks as well as mobile service providers and other businesses are using mobile messaging services like the short messaging service SMS to send various notification messages to their customers. A bank might send a SMS alert about an auto transfer from the user's account at 5:00 AM PST, which is 8:00 AM EST for the bank system based say in New York. There have been proposals to adjust the message delivery time for the time zone of the intended mobile recipient. However, these solutions have been developed for network elements or for the automated equipment that generate the messages, and are not directly controlled by the user and may not be implemented by all enterprises that want to send messages to a particular user. For example, a user's mobile service provider may have a time adjustment solution in place, but her bank may not. In which case, the bank's messages may still come in late at night such that the ringtone wakes the user.

The user may find the late night calls and messages, and the attendant ringtone alerts, very disturbing. However, the user may not want to turn her cell phone off or change the ringtone settings at night. If turned off, the mobile station would not record data regarding incoming calls and messages, which is often useful information. Also, the user may forget to turn the mobile station back on or change the settings back each morning. Turning the mobile station off or changing the settings every night is tedious for the user to do consistently on a long-term regular basis.

SUMMARY

The teachings herein alleviate one or more of the above noted problems with control of ringtone, e.g. to reduce or eliminate problems related to loud ringtones generated at inappropriate times such as during expected sleep hours.

For example, the detailed description and drawings disclose a method of controlling ringtone of a mobile station based on time, with respect to the ringtone applicable to incoming voice calls directed to the mobile station. The method involves receiving user inputs, of a setting of a selected time period and a first setting for a control parameter for the ringtone for incoming voice calls directed to the mobile station. The mobile station stores the selected time period setting and the first setting for the control parameter. Upon receiving signaling from a mobile communication network regarding a first incoming voice call directed to the mobile station, that occurs during the selected time period, ringtone generation of the mobile station is controlled in accordance with the stored first setting for the control parameter. However, upon received signaling from the mobile communication network regarding a second incoming voice call directed to the mobile station, that occurs at a time not within the selected time period, ringtone generation of the mobile station is controlled in accordance with a second setting for the control parameter for the ringtone for incoming voice calls.

For example, if the user selected period is expected sleep time, the setting might correspond to a no ring or zero volume, so that the mobile station does not output any audible ringtone in response to a voice call during the selected period, e.g. late at night. The user may specify a tone and volume level for a specific second time period, or the station may apply default settings for voice calls directed to the station outside the user selected time period.

Alone or in combination with the programmable setting of the ringtone applicable to incoming voice calls directed to the mobile station, there may also be a feature to allow control of ringtone of the mobile station based on time for the ringtone applicable to messages directed to the mobile station. In the examples, the ringtone programming may be applicable to a variety of different types of messages, such as short message service (SMS) messages, enhanced message service (EMS) messages, multimedia message service (MMS) messages, and voice mail messages.

The method of controlling ringtone of a mobile station based on time, applicable to messages, involves receiving user inputs for setting of a selected time period a first setting for a control parameter, with respect to the ringtone for messages directed to the mobile station. These settings are stored in the mobile station. Upon receiving signaling from a mobile communication network regarding a first message directed to the mobile station, during the selected time period, ringtone generation of the mobile station is controlled in accordance with the stored first setting for the control parameter. In response to signaling from the mobile communication network regarding a second message directed to the mobile station, at a time not within the selected time period, ringtone generation of the mobile station is controlled accordance with a second setting for the control parameter for the ringtone for messages directed to the mobile station.

The disclosure herein also encompasses an appropriately configured mobile station as well as programming that might be used to configure a mobile station to implement user programmable time settings for one or more ringtone features of the station, as outlined above. A software or program product, in accordance with the later concept, might include at least one machine-readable medium and programming carried by the medium for implementing the programmable time-based ringtone setting and control procedure(s).

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various concepts disclosed below, such as methods, mobile stations and/or programming for such stations, relate to techniques to address the time related problem with mobile station ringtones, such as the sleep disturbing ringtone problem. As discussed in more detail below with regard to specific examples, a mobile station may be configured to offer the user an option or feature such as might be called "Programmable Ringtone Settings by Time." When the feature is selected, it would allow the user to program the device with one or more time period settings and a related control parameter setting to configure the station to adjust one or more controllable parameters of ringtone for incoming calls and/or incoming messages based on current time in relation to the program time setting(s). For example, the user might set different ringtone parameters for different time slots for each day and/or different time slots on certain days of the week.

Figure 1:
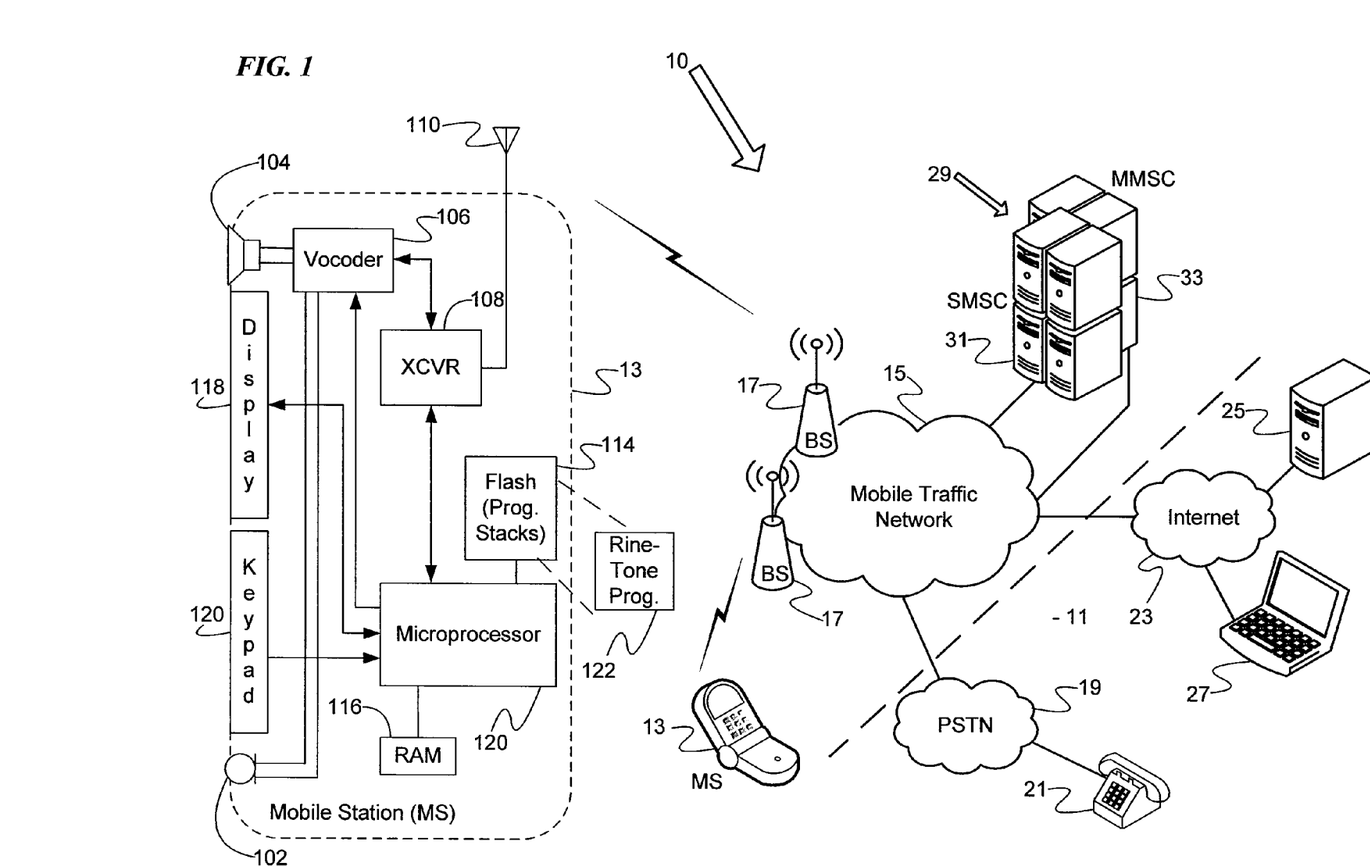
FIG. 1 is a high-level functional block diagram of an example of a system including a wireless mobile communication network and a block diagram of an exemplary mobile station, in which users may desire to program ringtone settings/characteristics as a function of time.

Reference now is made in detail to the examples illustrated in the accompanying drawings and discussed below. FIG. 1 is a high-level functional block diagram of an example of systems offering various communications services, including for mobile stations which may implement the ringtone setting based on time feature. The drawing also provides a block diagram illustration of a first exemplary wireless device, in this case a handset type mobile station. Those skilled in the art will be familiar with the stations, networks and systems, in general, and the elements shown in FIG. 1 will be discussed only briefly here to provide some exemplary context for the later discussion of examples of ringtone time setting operations and the attendant variation of output of ringtone(s) as a function of time.

Hence, FIG. 1 shows a mobile system or network(s) 10 for providing a variety of communication services to users of various mobile stations 13. The elements indicated by the reference numeral 10 generally are elements of the network and are operated by or on behalf of one or more carriers, although the mobile stations 13 typically are sold to the carrier's customers. The mobile communication network 10 provides communications between mobile stations 13 as well as communications for the mobile stations 13 with networks and stations 11 outside the mobile communication network 10. Two mobile stations 13 appear in the drawing, to represent examples of the mobile stations that may receive various services via the mobile communication network 10. Today, mobile stations typically take the form portable handsets, smart-phones or personal digital assistants, although they may be implemented in other form factors.

The network 10 allows users of the mobile stations 13 to initiate and receive telephone calls to each other as well as through the public switched telephone network (PSTN) 19 with telephone stations 21 connected thereto. The network 10 includes messaging centers or MCs 29 to support mobile messaging services such as SMS (short messaging service), EMS (enhanced messaging service, and MMS (multimedia message) type messaging between mobile stations and similar messaging with other devices 25, 27 via the Internet 23. By way of example, the drawing shows two of the MCs 29, one of which is a SMSC (short messaging service center) 31 and the other of which is a MMSC (multimedia message service center) 33. When a message for a mobile station 13 is received in a MC 29, the MC signals the mobile station 13 through the mobile traffic network 15 and the serving base station 17; and depending on its current settings, the mobile station may generate a ringtone to alert the user of the new message.

Although the messaging/storage systems are not shown, the network 10 will also include platforms providing voice mail functionalities. When a user does not answer a call or the user's mobile station 13 is off-line, the network routes the voice call to a voice mail system. The voice mail system advises the caller that the called party is not available and offers the caller the option to leave a recorded voice message for later retrieval by the called party. Of note for purposes of this discussion, if the caller leaves a message, the voice mail system signals the user's mobile station 13 of that fact. The user's mobile station has the capability to generate a ringtone alerting the user of the stored voice mail message.

The network 10 typically will also offer users a variety of other data services via the Internet 23, such as downloads, web browsing, e-mail, etc.

As discussed more below, one or more of the mobile stations served by the network 10 is configured to allow the user to program time and control parameter setting(s) for the ringtone or ringtones normally triggered in the device when the device receives signaling of an incoming call or is signaled regarding a message directed to the mobile station.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements, such as various messaging centers MCs 29 for SMS, MMS, voice mail or the like. A regional portion of the network 10, such as that serving mobile station 13, will typically include one or more RANs and a regional circuit and/or packet switched network and associated signaling network facilities.

Physical elements of a RAN operated by one of the mobile service providers or carriers include a number of base stations represented in the example by the base stations (BSs) 17. Although not separately shown, such a base station 17 typically comprises a base transceiver system (BTS) which communicates via an antennae system at the site of base station and over the airlink with one or more of the mobile stations 13 when the mobile stations are within range. Each base station 17 typically includes a BTS coupled to several antennae mounted on a radio tower within a coverage area often referred to as a "cell." The BTS is the part of the radio network that sends and receives RF signals to/from the mobile stations that the base station currently serves.

The radio access networks also include a traffic network represented generally by the cloud at 15, which carries the user communications for the mobile stations 13 between the base stations and other elements with or through which the mobile stations communicate. Other individual elements such as switches and/or routers forming the traffic network 21 are omitted here for simplicity.

The traffic network portion 15 of the mobile communication network 10 connects to a public switched telephone network (PSTN) 19. This allows the network 10 to provide voice grade call connections between mobile stations and regular telephones connected to the PSTN 19. The drawing shows one such telephone at 21.

The traffic network portion 15 of the mobile communication network 10 connects to a public packet switched data communication network, such as the network commonly referred to as the "Internet" shown at 23. Packet switched communications via the traffic network 15 and the Internet 23 may support a variety of user services through the network 10, such as mobile station communications of text and multimedia messages, e-mail, web surfing or browsing, programming and media downloading, etc. For example, the mobile stations 13 may be able to receive messages from and send messages to user terminal devices, such as personal computers, either directly (peer-to-peer) or via various servers (not separately shown). The drawing shows one server 25 and one user terminal device as a personal computer (PC) at 27, by way of example.

A mobile station 13 communicates over the air with a base station 17 and through the traffic network 15 for various voice and data communications, e.g. with the Internet 23 and/or with terminals 23 and application servers 25. The over-the-air communications also enable communication of SMS, MMS or messages of other mobile messaging services such as EMS, which are stored and forwarded by the appropriate MCs 29, e.g. by the SMSC 31 or the MMSC 33 in our example.

When any of these communications for a mobile station 13 are directed to the mobile station 13, the station will receive signaling from the base station 17 of the network 15; and in response, the mobile station 13 will alert the user to the incoming communications. Alerts may be audible, visual and/or tactile. An audible alert may be virtually any type of sound that a mobile station is programmed to generate. A visual alert typically is a textual or graphic output via display although there may also be flashing lights. An example of a tactile alert is a vibration of the device. Of particular interest in our discussion are the audible alerts, which are often referred to generally as "ringtones" or "call sounds."

In the example of FIG. 1, when the network 10 attempts to deliver a call to a particular mobile station 13, e.g. from another mobile station or from a PSTN connected telephone 21, the base station 17 serving the station 13 will transmit signaling regarding the incoming call over the air to the particular mobile station 13. In response, the mobile station will generate an alert to inform the user of the call, in a form determined by the current settings of the mobile station. Often, the settings will specify that the alert should take the form of a particular user selected ringtone and have a particular user selected volume level. If the user hears the ringtone or notices any other type of alert generated by the mobile station, the user can choose whether or not to operate the mobile station 13 to answer the incoming telephone call.

For voice mail messages or mobile messaging service messages, the mobile station will also alert the user when it receives signaling regarding a new message. Consider a SMS type text message by way of an example. Whether sent by another mobile station 13 or by an application on a server, the SMS message initially goes to and is stored in one of the SMSCs 31 that services the particular mobile station identified as the intended recipient by the destination address field of the message. The SMSC 31 initiates signaling through the network to inform the addressed mobile station, and as a result, the base station 17 serving the station 13 will transmit signaling regarding the incoming SMS message over the air to the particular mobile station 13. In response, the mobile station will generate an alert to inform the user of the new SMS, in a form determined by the current settings of the mobile station. Often, the settings will specify that the alert should take the form of a particular user selected ringtone (may be different from that for an incoming call) and have a particular user selected volume level. If the user hears the ringtone or notices any other type of alert generated by the mobile station, the user can choose whether or not to operate the mobile station 13 to review the new SMS message. Similar signaling, alerts and message retrieval procedures allow users to receive and review other types of incoming mobile message service messages, such as EMS or MMS messages. The network and mobile station also alert the user when the network has received and stored a voice mail message.

In the examples discussed herein, the mobile stations offer the user the capability to program one or more of the ringtone setting parameters, e.g. for incoming calls and/or for one or more types of messages directed to the mobile station, as a function of time. For example, to avoid annoying rings for telephone calls or messages during hours planned for sleeping, the user might program a mobile station to not generate an audible ring for any type of call or messages during certain late night and early morning hours. The same settings may apply to all days of the week, or the time settings may vary for some or all different days of the week (e.g. between weekdays and weekends or from day-to-day for all seven days of the week).

Figure 2:
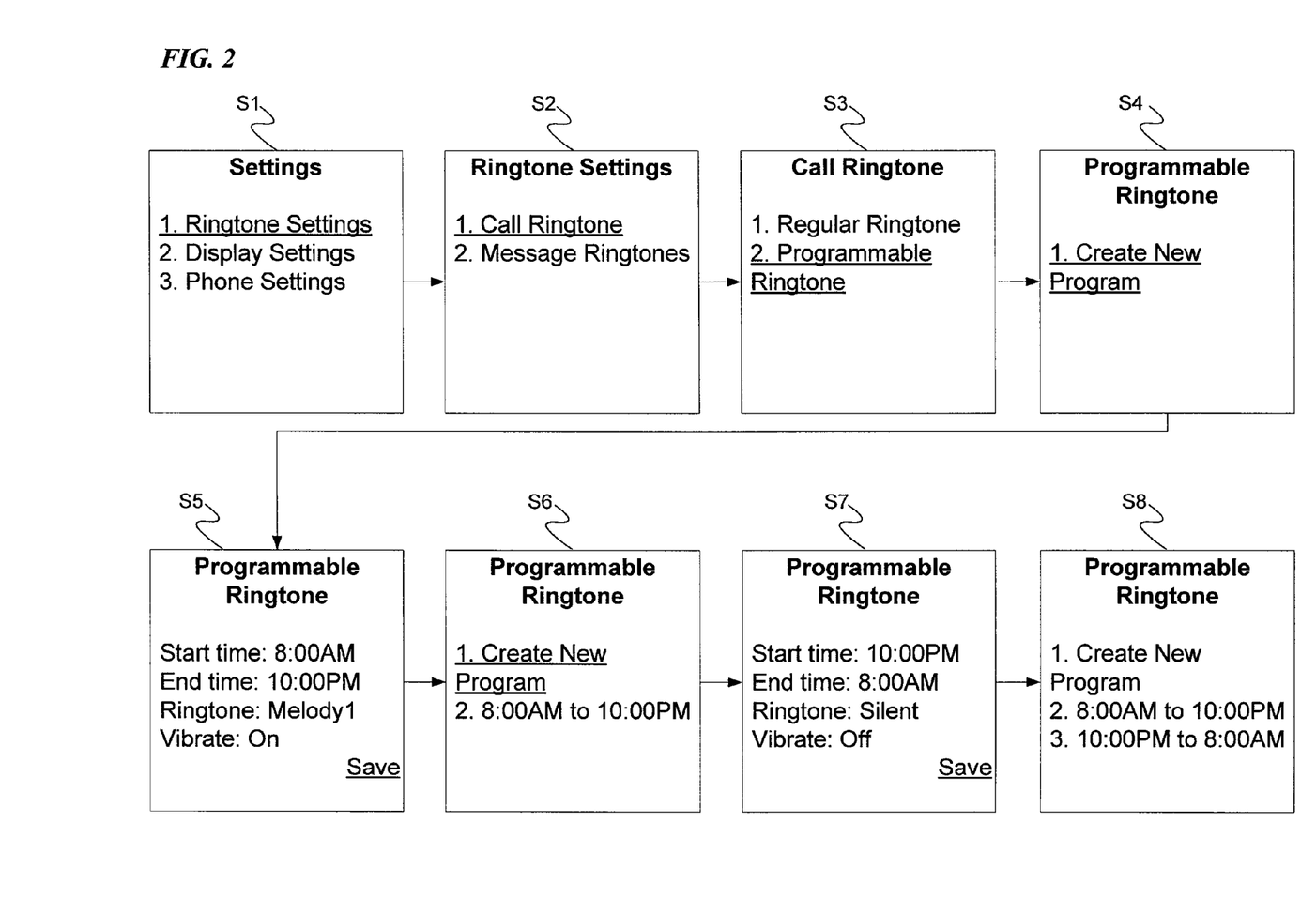
FIG. 2 is an exemplary functional flow-chart, in the form of a series of screens as may be presented to a user on a mobile station, to allow the user to program ringtone settings for incoming telephone calls in a mobile station.

FIG. 2 is an exemplary functional flow-chart, in the form of a series of screens as may be presented to a user on a mobile station, to allow the user to program ringtone settings for incoming telephone calls in a mobile station 13. As shown in the flow chart, the user would operate the mobile station to select a settings menu, and in response, the mobile station would display that menu. S1 represents a simple example of a settings menu as might be displayed by the mobile station 13. The menu offers the user several options, only three of which are shown. Of note for our discussion, one of the options is a "Ringtone Settings" option. At this point, if the user selects the Ringtone Settings option, for example, by pressing the number 1 key on the mobile station keypad, then at S2, the mobile station will display a Ringtone Settings menu.

The menu displayed at S2 can offer the user options to input settings for one, two or more different types of ringtones offered by the particular model of mobile station. For example, more ringtone options may be offered, e.g. for different types of incoming calls (from parties on the contact list, parties not on the contact list, calls for which there is not caller ID or caller ID is blocked, etc.) and/or for different types of messages (e.g. SMS, MMS etc.). For purposes of discussion, we will assume that the mobile station can provide a ringtone for voice calls and ringtones for several types of messages directed to the station. In the example, the menu displayed at step S2 offers a first option to select ringtone settings with regard to voice calls, indicated as the call ringtone in the example, and a second option to select ringtone settings with regard to messages indicated as message ringtones in the example. Settings with respect to messages are discussed later with respect to FIG. 3.

In the example of FIG. 2, the user selects the "Call Ringtone" option from the Ringtone Settings menu, therefore the mobile station next displays a Call Ringtone menu at step S3. The menu here may offer a number of different selections. For this simple example, we have assumed that the menu at S2 offers two options. A first option allows the user to set regular ringtone. This option may branch the processing flow to another menu where the user can input settings for the selected regular ringtone operations, e.g. the ringtone and volume level for non-timed operations in response to incoming voice telephone calls. The menu structure and/or ringtone operations in the event that the user selects the "Regular Ringtone" option from the menu displayed at S2 may be similar to or the same as any of the ringtone control settings and operations as found in various models of mobile stations today.

However, for purposes of our example, we will assume for now that the user operates the number 2 key of the keypad or otherwise operates the station to select the Programmable Ringtone option from the Call Ringtone menu displayed at step S3. Hence, the mobile station next displays a Programmable Ringtone menu at step S4. The menu here may offer a number of different selections. In the example, we assume that the mobile station has not previously been programmed by the user to set ringtone parameters based on time. Hence, in the example, the one selection at S4 is to "Create New Program." Of course, if there was an existing program, an alternative option might be to modify the existing program, as will be discussed later.

When the user selects the "Create New Program" option from the Programmable Ringtone menu displayed at step S4, for example, by operation of the number 1 key on the keypad of the mobile station, then the mobile station changes the display from the Programmable Ringtone menu of S4 to a Programmable Ringtone parameter entry screen as shown at S5.

In this screen, the user can operate up/down keys or specific numeric keys as needed to input new ringtone program settings. In the example, the station allows user inputs for setting a start time, for setting an end time, for setting a ringtone and for a vibrate selection. The start and end time settings define a user selected time period for application of the control parameter settings (ringtone, volume and/or vibrate mode). In the example at S5, the user selects 8:00 AM as the start time and 10:00 PM as the end time; and for that daily period, the user selects one of the stored ringtones for playback, Melody 1, in the specific example. The user can select ON or OFF for the associated vibrate function, and in the example, the user sets the vibrate function for incoming calls to ON. The screen now offers the user an option to save these program settings. The user can review the settings for the new ringtone program, and make changes if desired. Once satisfied with the settings for the program, the user activates the keypad or other user interface element to select the "Save" option; and in response, the mobile station stores the program settings in memory for future use in controlling ringtone functions with regard to incoming voice type telephone calls.

At step S6, after the Save operation, the mobile station returns to a display of the Programmable Ringtone menu, but now that menu shows the saved program as option number 2 and shows the Create New Program as option number 1. The user can select option 1 to create another program, e.g. for another time slot, or the user can select option 2 to modify the program input at step S5 in our example. The user can press the end key on the mobile station to exit the menu.

If the user does not cover a time slot in a day, the mobile station will use the Regular Ringtone (default) settings for that time slot. For purposes of an example for discussion, however, assume that the user now chooses option 1 again, by operation of the number 1 key on the keypad or other user interface element of the mobile station. Hence, at this point in our example, the mobile station changes the display from the Programmable Ringtone menu of S6 to the Programmable Ringtone parameter entry screen as now shown at S7.

In this screen (at S7), the user can operate up/down keys or specific numeric keys as needed to input new ringtone program settings for start time, end time, ringtone and vibrate selection, for the second time slot or period. In the example at S7, the user selects 10:00 PM as the start time and 8:00 AM as the end time; and for that daily period, the user selects Silent ringtone, at this point in the specific example. This corresponds to a ringtone OFF condition. The user can select ON or OFF for the associated vibrate function, and in the example, the user sets the vibrate function for incoming calls to OFF for this second time period. As in S5, the screen at S7 now offers the user an option to save these program settings after review, any desired changes and confirmation that the input settings for this period are those that the user desired. When the user selects the "Save" option, the mobile station stores the program settings for the time period in memory for future use in controlling ringtone functions with regard to incoming voice type telephone calls during that second time period.

At step S8, after the second Save operation, the mobile station returns to a display of the Programmable Ringtone menu, but now that menu shows the two saved program settings, with the latest saved program listed as option number 3. Again, the user could select option 1 to create another new program for yet a further time slot, or the user could select option 1 or option 2 to modify either of the saved programs. However, in this example, the user has covered all hours of all days of the week and we will assume that she is satisfied with the programmable ringtone settings. Hence, the user may press the End key on the mobile station or otherwise exit the menu to end the program operations.

In the example, the user opted to first program in the settings for normal hours of operation (ringtone ON) and then program in the settings for the expected sleep period (ringtone OFF). Of course, the mobile station allows the user to program the periods/settings in any desired order.

When a user tries to create program with a time period that overlaps a time period in an existing program, the mobile station will not allow the user the save the program. The station may display an explanation of the conflict. It is also envisioned that the mobile station may allow the user to create programs for Saturday, Sunday, and weekday separately, so that the user can have different time-based ringtone settings for different days of the week, although such further options are not shown in this diagram for convenience.

In the example, once program settings for the two periods are saved, the mobile station controls ringtone output for incoming calls based on the stored time and parameter settings. For example, when signaled of an incoming call during the day (in the period set in the first program in the example), the mobile station will play melody 1 and vibrate. The mobile station will apply the then current volume setting. However, when signaled of an incoming call late at night (during the period set in the second program) the mobile station will not generate any audible sound and will not vibrate.

Figure 3:
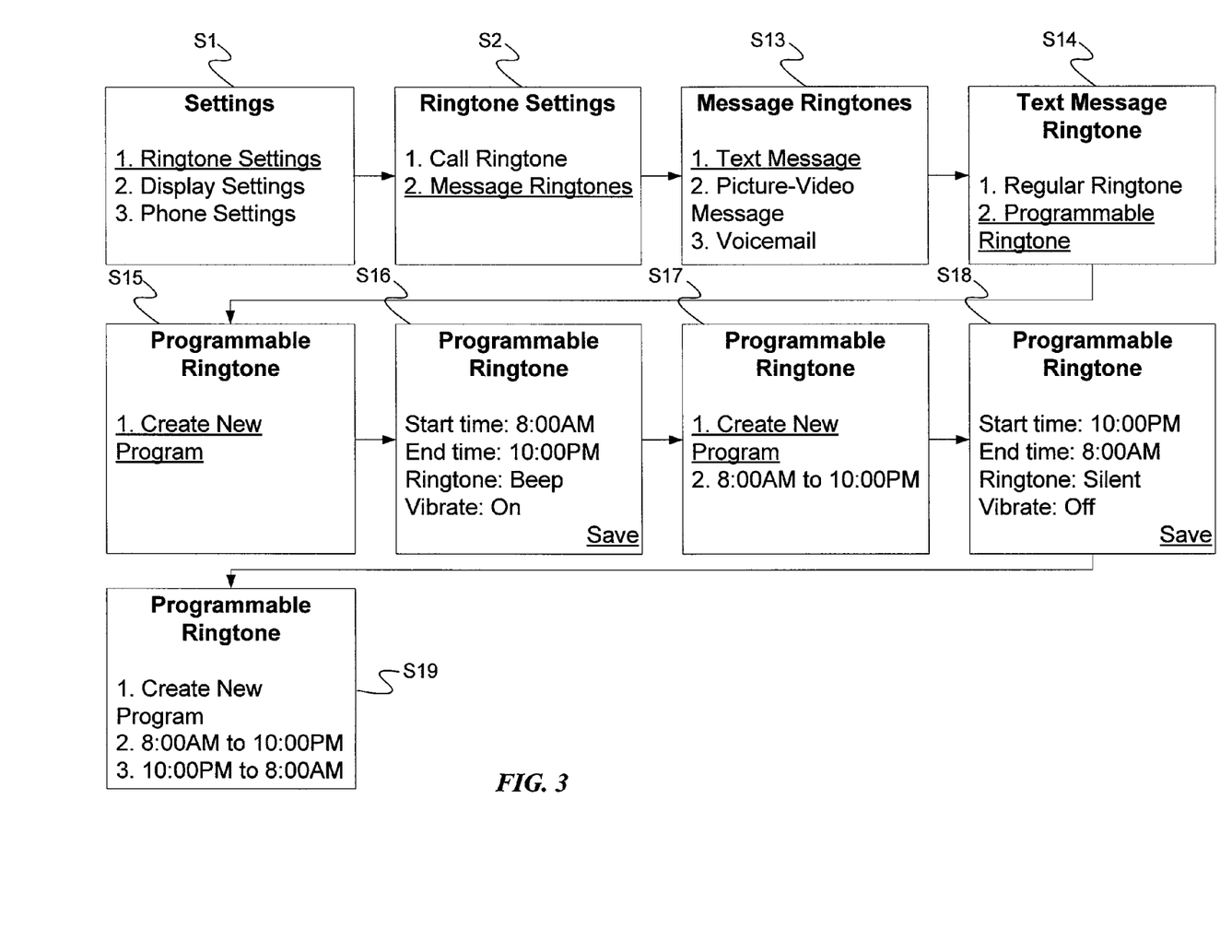
FIG. 3 is an exemplary functional flow-chart, in the form of a series of screens as may be presented to a user on a mobile station, to allow the user to program ringtone settings for incoming mobile messaging service messages in a mobile station.

FIG. 3 is an exemplary functional flow-chart, in the form of a series of screens as may be presented to a user on a mobile station, to allow the user to program ringtone settings for messages directed to the mobile station 13. Step S1 and the menus shown in that step and in step S2 are the same as in the similarly numbered steps in the process of FIG. 2. However, in this second example (FIG. 3), we will assume that the user operates the interface of the mobile station to select option 2 from the Ringtone Settings menu. Hence, in the example, after the user selection at step S2, the mobile station next displays the Message Ringtone menu at S13. The mobile station may offer ringtone setting capabilities for a number of different types of messaging services offered by the network 10. For this example, we will assume that the network offers SMS type text messages, picture and video messages via MMS or the like, as well as a voice mail service; therefore we will also assume that the mobile station supports different ringtones as well as independently programmable ringtone settings for each of these different types of message services.

In many cases, fairly similar procedures would apply for user programming of the ringtone settings for the various types of message services. For purposes of discussion, we will consider text messaging as an appropriate example of one such procedure. Hence, in the example of FIG. 3, the user selects the "Text Message" option from the Message Ringtone menu at S13, therefore the mobile station next displays a Text Message Ringtone menu at step S14. The menu here may offer a number of different selections. For this simple example, we have assumed that the menu at S2 offers two options. A first option allows the user to set regular ringtone. This option may branch the processing flow to another menu where the user can input settings for the selected regular ringtone operations, e.g. the ringtone and volume level for non-timed operations in response to incoming messages of the selected type, that is to say for text messages at this point in the present example. The menu structure and/or ringtone operations in the event that the user selects the "Regular Ringtone" option from the menu displayed at S14 may be similar to or the same as any of the ringtone control settings and operations as found in various models of mobile stations today to set ringtone for text or other types of messages.

However, for purposes of our example, we will assume for now that the user operates the number 2 key of the keypad or otherwise selects the Programmable Ringtone option from the Text Message Ringtone menu displayed at step S14. Hence, the mobile station next displays a Programmable Ringtone menu at step S15, much like was done in the call ringtone setting example of FIG. 2. The menu here may offer a number of different selections, however, we are assuming at this point in our example that the mobile station has not previously been programmed by the user to set ringtone parameters for text messages based on time. Hence, at S15 in this example, the one selection is to "Create New Program."

When the user selects the "Create New Program" option from the Programmable Ringtone menu displayed at step S15, for example, by operation of the number 1 key on the keypad of the mobile station, then the mobile station changes the display from the Programmable Ringtone menu of S15 to a Programmable Ringtone parameter entry screen as shown at S16. This screen and the user input operations in relation to that screen are similar to those in the call ringtone setting example of FIG. 2.

In the screen shown at S16, the user again may operate up/down keys or specific numeric keys as needed to input new ringtone program settings for: a start time, an end time, a ringtone and vibrate selection. In this case, the settings are for use in response to incoming text messages. In the example at S16, the user selects 8:00 AM as the start time and 10:00 PM as the end time; and for that daily period, the user selects one of the stored ringtones for playback, Beep, in the specific example. The user can select ON or OFF for the associated vibrate function, and in the example, the user sets the vibrate function for incoming calls to ON. For ease of discussion and illustration, the period setting and the vibrate setting are the same as for the first program established for the call ringtone settings in the example of FIG. 2, although those skilled in the art will recognize that the user may input different settings for any and all of the program parameters for the time slot with respect to text messages or any of the other types of messages.

The screen shown at S16 now offers the user an option to save these program settings. The user can review the settings for the new program, and make changes if desired. Once satisfied with the settings for the program, the user activates the keypad to select the "Save" option, and in response, the mobile station stores the program settings in memory for future use in controlling ringtone functions with regard to incoming text type messages.

At step S17, after the Save operation, the mobile station returns to a display of the Programmable Ringtone menu, but now that menu shows the saved program text messages as option number 2 and shows the Create New Program as option number 1. The user can select option 1 to create another program, e.g. for text messages coming-in during another time slot, or the user can select option 2 to modify the program input at step S16 in our example. The user can press the end key on the mobile station to exit the menu.

As in the call ringtone example, if the user does not cover a time slot in a day, the mobile station will use the Regular Ringtone (default) settings for that time slot for text messages. For purposes of an example for discussion, however, assume that the user again chooses option 1, for example, by operation of the number 1 key on the keypad or other interface element of the mobile station. Hence, at this point in our example, the mobile station again changes the display from the Programmable Ringtone screen of S17 to the Programmable Ringtone parameter entry screen as now shown at S18.

In this screen (at S17), the user can operate up/down keys or specific numeric keys as needed to input new ringtone program settings for: a start time, an end time, a ringtone and vibrate selection. These settings are for text messages with respect to a second time period. In the example at S18, the user selects 10:00 PM as the start time and 8:00 AM as the end time; and for that daily period, the user selects Silent ringtone, at this point in the specific example. This corresponds to a ringtone OFF condition. The user can select ON or OFF for the associated vibrate function, and in the example, the user sets the vibrate function for incoming messages to OFF for this second time period. As noted, for convenience, these parameters for text messages are similar to those used for call ringtones in the example of FIG. 2, but the mobile station and its procedures in our example allow the user to input different ringtone settings for text messages. The screen at S18 now offers the user an option to save these program settings after review, any desired changes and confirmation that the input settings for this period are those that the user desired. When the user selects the "Save" option, the mobile station stores the text message ringtone program settings for the second time period in memory for future use in controlling ringtone functions with regard to text messages direct to the mobile station during that second time period.

At step S19, after the second Save operation, the mobile station returns to a display of the Programmable Ringtone menu, but now that menu shows the two saved text message ringtone program settings, with the latest saved program listed as option number 3. Again, the user could select option 1 to create another new program for yet a further time slot, or the user could select option 1 or option 2 to modify either of the saved programs. However, in this example, the user has covered all hours of all days of the week and we will assume that she is satisfied with the programmable ringtone settings for text messages. Hence, the user may press the End key on the mobile station or otherwise exit the menu to end the program operations.

As in the operation for programming ringtone settings for telephone calls, the order of the periods and setting inputs is given by way of example. The mobile station allows the user to select the periods in any desired order.

As with the call ringtone programming, if a user tries to create program with a time period that overlaps a time period in an existing program, the mobile station will not allow the user the save the program. The station may display an explanation of the conflict. It is also envisioned that the mobile station may allow the user to create programs for text message or other message types for Saturday, Sunday, and weekday separately, so that the user can have different time-based ringtone settings for various types of messages for different days of the week, although such further options are not shown in this diagram for convenience.

In the example, once program settings for text messages for the two periods are saved, the mobile station controls ringtone output for text messages directed to the station based on the stored time and parameter settings. For example, when signaled of a text message for the station during the day (in the period set in the first program), the mobile station will beep and vibrate. The mobile station will apply the then current volume setting. However, when signaled of a text message late at night (during the period set in the second program), the mobile station will not generate any audible sound and will not vibrate.

The discussion and illustration of the menu and key entry technique for input of the time and parameter settings, with respect to FIGS. 2 and 3, are given by way of example, only. Those skilled in the art will recognize that mobile stations may implement a variety of other approaches with regard to the input/output strategy to enable a user to program-in the relevant ringtone settings. For example, other techniques may be used for receiving the settings for the predetermined times, e.g. instead of inputs of start and end times, the mobile station might be configured to prompt the user for input of a start time and a duration. As another example, different sequences or information displays on the menus in the setting input flows may be used. The displays could be more graphical, instead of the simple text in the examples. Furthermore, the description of the examples assumed displays for user output and key operations for the input of various settings. Those skilled in the art will appreciate that other user interface techniques may be adopted, such as audible prompts and receipt of responsive verbal/speech commands for the input of the settings.

As shown by the above discussion, the setting of time(s) and one or more parameters and attendant control of the ringtone output of a mobile station may be implemented by programming or the like in any of the mobile stations 13. Those skilled in the art presumably are familiar with the structure, programming and operations of such stations. However, for completeness, it may be useful to consider the functional elements/aspects of an exemplary mobile station, at a high-level.

For purposes of such a discussion, returning to FIG. 1, that drawing also provides a block diagram illustration of an exemplary mobile station 13. Although the wireless device 13 may be a smart-phone or may be incorporated into another device, such as a personal digital assistant (PDA) or the like, for discussion purposes, the illustration shows the mobile station 13 in the form of a handset. The handset embodiment of the mobile station 13 functions as a normal digital wireless telephone station. For that function, the mobile station 13 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

The decode side of the vocoder 106 and the speaker 104 also can be instructed to generate other audible outputs, as or when appropriate. For purposes of this discussion, these elements can generate specific tones or replay recorded audio, for use as ringtone type alerts for incoming calls and/or for new incoming messages.

For digital wireless communications, the handset 13 also includes at least one digital transceiver (XCVR) 108. Today, the handset 13 would be configured for digital wireless communications using one or more of the common network technology types. The concepts discussed here encompass embodiments of the mobile station 13 utilizing any digital transceivers that conform to current or future developed digital wireless communication standards. The mobile station 13 may also be capable of analog operation via a legacy network technology, at least for voice telephone communications.

The transceiver 108 provides two-way wireless communication of information, such as vocoded speech samples and/or digital message information, in accordance with the technology of the network 10. The transceiver 108 also sends and receives a variety of signaling messages in support of the various voice, messaging and data services provided via the mobile station 13 and the communication network 10, in this case, including the signaling for incoming telephone calls as well as incoming voice mail messages and various mobile messaging service messages. Each transceiver 108 connects through RF send and receive amplifiers (not separately shown) to an antenna 110.

The mobile station 13 includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input and output elements of the graphical user interface (GUI), e.g. for multimedia (e.g., audio and/or video) communications. Of course other user interface elements may be used, such as a stylus and touch sensitive display screen, as in a PDA or smart phone. The microphone, speaker and vocoder may also be used to provide an audio user interface e.g. for output of audio information and input of verbal commands. In addition to normal telephone and data communication related input/output (including message input and message display functions), the user interface elements also may be used for presentation of menus and other information to the user and user input of selections, for example, including any needed to program time and other parameter settings for the various ringtones.

In the example, a microprocessor 112 serves as a programmable controller or processor for the mobile station 13, in that it controls all operations of the mobile station 13 in accord with programming that it executes, for all normal operations, and for operations involved in the authentication and identification procedure under consideration here. In the example, the mobile station 13 includes flash type program memory 114, for storage of various "software" or "firmware" program routines and mobile configuration settings, such as mobile telephone number (MTN or MDN), etc. The mobile station 13 may also include a non-volatile random access memory (RAM) 116 for a working data processing memory. The RAM, for example, may store an assigned IP address for the duration of a data registration on the network 10. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 13 includes a processor, and programming stored in the flash memory 114 configures the processor so that the mobile station is capable of performing various desired functions, including in this case the functions involved in programming ringtone operation based on time and the functions involved in controlling ringtone generation in accordance with the user programmed settings. In the example, the executable programming stored in the flash memory 114 includes a plurality of device applications, at least one (122) of which controls ringtone and enables programming of settings to control various ringtones as a function of time. The ringtone application 122 controls the actual ringtone generation functions as well as driving the user interface on the mobile station 13, to provide the outputs to the user and to allow user inputs related to ringtone settings as discussed above with respect to FIGS. 2 and 3.

The structure and operation of the mobile station 11, as outlined above relative to FIG. 3, were described to by way of example, only.

As shown by the above discussion, functions relating to the programmable time-based setting of ringtone in a mobile station may be implemented by programming of the station. The software functionalities involve programming, including executable code as well as associated stored data, e.g. user settings for the ringtone control functions (time, volume, particular tone or other signals selected for audible output as the ringtone(s), vibrate mode or the like). The software code is executable by the processor of a mobile station once downloaded and installed for execution. At other times, however, the software may be stored at other locations and/or transported for loading into the appropriate general-purpose computer system or mobile station device. Execution of ringtone application programming by a processor of the mobile station enables the station to implement the methodology for time setting and attendant control of ringtone output, in essentially the manner performed in the implementations discussed and illustrated herein. However, the programming may at times reside on computers connected for data communication via the components of the network 10 or a packet data network, for example, operating as a server for downloading the programming over-the-air into various ones of the mobile stations 13, to allow those stations to operate in accordance with the methodology outlined above. Although special purpose devices may be used as the server(s) for supplying software to mobile stations, such devices also may be implemented using one or more hardware platforms intended to represent a general class of data processing device commonly used to run "server" programming so as to implement the functions discussed above, albeit with an appropriate network connection for data communication.

Figures 4, 5:
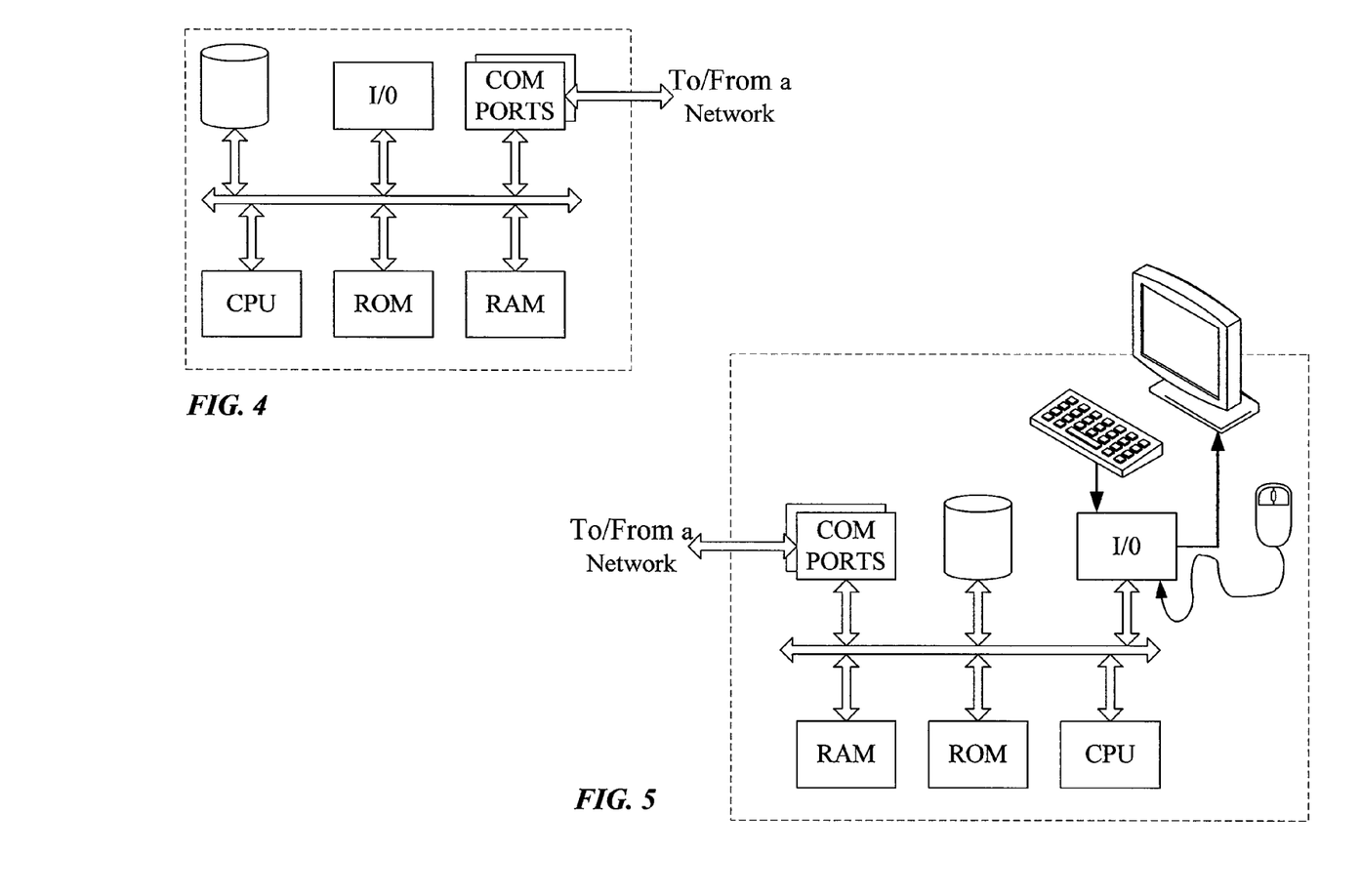
FIG. 4 is a simplified functional block diagram of a computer that may be configured as a host or server, for example, to allow downloading of programming software for implementing the ringtone setting feature to a mobile station.
FIG. 5 is a simplified functional block diagram of a personal computer or other work station or terminal device, although that device may also be configured as a server for downloading.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. FIGS. 4 and 5 provide functional block diagram illustrations of general purpose computer hardware platforms, as might be used as servers or other computers for downloading programming such as used to implement the ringtone setting and control examples above into a mobile station. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that those skilled in the art are familiar with the structure, programming and general operation of such computer equipment and as a result the drawings should be self-explanatory.

Hence, aspects of the methods of establishing a time schedule and related parameters to control one or more characteristics of the ringtone output as a function of time, for example, to provide different volumes at different times of the day in response to incoming calls, messages, or the like, as outlined above, may be embodied in programming for a mobile station. Program aspects of the technology may be thought of as "products" or "articles of manufacture" typically in the form of executable code and/or associated data that is carried on or embodied in a type of machine readable medium. "Storage" type media include any or all of the tangible, non-transitory memory of the mobile stations, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer into one or more of the mobile stations 13. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible non-transitory storage medium, a carrier wave medium or a physical transmission medium. Non-volatile tangible non-transitory storage media include, for example, optical or magnetic disks, such as any of the storage devices in any of the mobile stations, various computers or the like, as shown in the drawings. Volatile tangible non-transitory storage media include dynamic memory, such as main memory of such a computer platform or mobile station. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Many of these forms of computer or machine readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method, comprising:
a mobile station enabling a user to select a first ringtone for a first type of communication and a second ringtone for a second type of communication that may be directed to the mobile station, the mobile station further enabling the user to select at least one time period related to each of the first type of communication and the second type of communication, wherein the first and second types of communication are selected from among communication types within one of a plurality of different categories of communications based on an originating source of each type of communication within the one category of communications directed to the mobile station;
upon receiving a communication directed to the mobile station, the mobile station determining a time of receipt of the communication and whether the communication is of the first type or of the second type;
controlling ringtone utilization at the mobile station using the first ringtone in accordance with a first control parameter, when the time of receipt of the communication is determined to be within the user-selected time period and the received communication is determined to be of the first type; and
controlling ringtone utilization at the mobile station using the second ringtone in accordance with a second control parameter, when the time of receipt is determined to be within the user-selected time period and the received communication is determined to be of the second type.

2. The method of claim 1, wherein the enabling by the mobile station further comprises enabling the user to select the first control parameter for the first ringtone and the second control parameter for the second ringtone.

3. The method of claim 1, further comprising storing, in the mobile station, the first and second control parameters for the respective first and second ringtones.

4. The method of claim 1, wherein controlling utilization of the first and second ringtones comprises using the first and second control parameters to determine whether to play the respective first and second ringtones, based on the time of receipt of the communication and whether the communication is of the first type or of the second type.

5. The method of claim 4, wherein the controlling utilization of the first and second ringtones further comprises:
upon determining that the first ringtone or the second ringtone is to be played, adjusting a non-zero volume level for playing the first ringtone according to the first control parameter or the second ringtone according to the second control parameter, based on the time of receipt of the communication and whether the communication is of the first type or of the second type.

6. The method of claim 1, wherein the mobile station is configured to use a default ringtone when the time of receipt of the communication is outside of the user-selected time period.

7. The method of claim 6, wherein the mobile station is configured to play the default ringtone at a default volume level, when the time of receipt of the communication is outside of the user-selected time period.

8. The method of claim 1, wherein the categories of communications include an incoming calls category and an inbound messages category, the incoming calls category includes different types of incoming voice calls directed to the mobile station, and the inbound messages category includes different types of electronic messages directed to the mobile station.

9. The method of claim 8, wherein the different types of electronic messages of the inbound messages category include a short message service (SMS) message, an enhanced message service (EMS) message, and a multimedia message service (MMS) message.

10. An article of manufacture, comprising programming instructions for configuring the mobile station to implement the steps of the method of claim 1, and a tangible non-transitory machine readable storage medium bearing the instructions.

11. A method, comprising:
   a mobile station enabling a user control for controlling ringtone utilization by the mobile station for different types of communication that may be directed to the mobile station, based on a type of communication and a time of receipt for the type of communication, the user control including a first option for specifying whether a ringtone is to be played at the mobile station, and, when the first option specifies that a ringtone is to be played, the user control further including at least one second option for selecting one of a plurality of ringtones to play and a non-zero volume level for playing the selected ringtone, wherein the different types of communication are selected from among communication types within one of a plurality of different categories of communications based on an originating source of each type of communication within the one category of communications directed to the mobile station;
   upon receiving a communication directed to the mobile station, the mobile station determining the time of receipt and the type of the received communication; and
   the mobile station controlling ringtone utilization in accordance with the user control, based on the determined time of receipt and type of the communication.

12. The method of claim 11, wherein the user control:
   enables a user of the mobile station to select multiple time periods for each type of communication that may be directed to the mobile station and, for each of the time periods for each type of communication, whether a ringtone is to be played and, when a ringtone is to be played, which of the plurality of ringtones is to be played and a volume level to play that ringtone, and configures the mobile station to respond to the determined time of receipt and type of the communication in accordance with the user selections.

13. The method of claim 11, wherein the mobile station is configured to use a default setting for controlling ringtone utilization when the time of receipt of the communication directed to the mobile station is outside of a user-selected time period for the determined type of the received communication, the default setting including a predetermined option specifying whether a default ringtone is to be played, and, when the predetermined option specifies that the default ringtone is to be played, the default setting further including the non-zero volume level for playing the default ringtone.

14. The method of claim 13, wherein the default ringtone is dependent on the type of communication.

15. The method of claim 11, wherein the categories of communications include an inbound messages category, the incoming calls category includes different types of incoming voice calls directed to the mobile station, and the inbound messages category includes different types of electronic messages directed to the mobile station.

16. The method of claim 15, wherein the different types of electronic messages within the inbound messages category include a short message service (SMS) message, an enhanced message service (EMS) message, and a multimedia message service (MMS) message.

17. An article of manufacture, comprising programming instructions for configuring the mobile station to implement the steps of the method of claim 11, and a tangible non-transitory machine readable storage medium bearing the instructions.

18. The method of claim 8, wherein:
   the one category of communications is the incoming calls category, and
   the different types of incoming voice calls within the incoming calls category include incoming calls from callers associated with a contact list of the mobile station, incoming calls from callers not associated with the contact list, and incoming calls from callers having a caller ID that is unknown or blocked.

19. The method of claim 1, further comprising:
   upon receiving input from the user for selecting a new time period related to at least one ringtone for each of the first and second types of communication, determining whether or not the new time period overlaps with the time period previously selected for the first and second types of communication; and
   preventing the new time period for the at least one ringtone and the different types of communication from being programmed to a memory of the mobile station, when the new time period is determined to overlap with the previously selected time period for the first and second types of communication.

20. The method of claim 19, further comprising:
   displaying an explanation of the overlap on a screen of the mobile station, when the new time period is determined to overlap with the previously selected time period for the first and second types of communication.

* * * * *